(12) United States Patent
Stolfo

(10) Patent No.: US 10,686,836 B1
(45) Date of Patent: Jun. 16, 2020

(54) HOST-BASED DECEPTION SECURITY TECHNOLOGY

(71) Applicant: Salvatore J Stolfo, New York, NY (US)

(72) Inventor: Salvatore J Stolfo, New York, NY (US)

(73) Assignee: Allure Security Technology Inc., Waltham, MA (US)

( * ) Notice: Subject to any disclaimer, the term of this patent is extended or adjusted under 35 U.S.C. 154(b) by 0 days.

(21) Appl. No.: 16/174,417

(22) Filed: Oct. 30, 2018

Related U.S. Application Data

(60) Provisional application No. 62/578,898, filed on Oct. 30, 2017.

(51) Int. Cl.
  *H04L 29/06* (2006.01)
(52) U.S. Cl.
  CPC ........ *H04L 63/1491* (2013.01); *H04L 63/105* (2013.01)
(58) Field of Classification Search
  None
  See application file for complete search history.

(56) References Cited

U.S. PATENT DOCUMENTS

| | | | | |
|---|---|---|---|---|
| 2005/0071684 | A1* | 3/2005 | Sorkin | H04L 63/0227 726/4 |
| 2006/0112418 | A1* | 5/2006 | Bantz | G06F 21/88 726/4 |
| 2010/0077483 | A1* | 3/2010 | Stolfo | G06F 21/554 726/24 |
| 2010/0218240 | A1* | 8/2010 | Chiruvolu | G06F 21/31 726/5 |
| 2015/0281210 | A1* | 10/2015 | Weisberger | H04L 63/083 726/28 |
| 2015/0350213 | A1* | 12/2015 | Varadarajan | H04L 63/10 713/189 |

OTHER PUBLICATIONS

Banerjee, et al., "A Look at Deception—Flow to start playing offense against advanced attackers", Symantec White Paper, Sep. 18, 2017.

* cited by examiner

*Primary Examiner* — Henry Tsang
(74) *Attorney, Agent, or Firm* — Kelley Drye & Warren LLP

(57) ABSTRACT

Systems and methods for generating and deploying decoy files and decoy applications that appear to be authentic files and applications. The content of the decoy files may be configurable, and the decoy files may be beaconized. The extent to which decoy files are and decoy applications are deployed may depend on the authentication level or change in authentication level of a user.

19 Claims, 5 Drawing Sheets

FIGURE 2

HOST-BASED DECEPTION SECURITY TECHNOLOGY

CROSS REFERENCE TO RELATED APPLICATION

This application claims the benefit of U.S. Provisional Patent Application No. 62/578,898, filed Oct. 30, 2017. The entire contents of that application are incorporated herein by reference.

BACKGROUND OF THE INVENTION

Much research in computer security has focused on the means of preventing unauthorized and illegitimate access to systems and information. Unfortunately, the most damaging malicious activity is conducted by sophisticated nation-state adversaries who gain internal access to sensitive systems. Despite classic internal operating system security mechanisms and the body of work on formal specification of security and access control policies, including Bell-LaPadula and the Clark-Wilson models, there still exists an extensive problem of securing sensitive systems from remote attack. Indeed in many cases, formal security policies are incomplete and implicit. or they are purposely ignored to accomplish business goals.

SUMMARY OF THE INVENTION

The present invention concerns the security of host computer systems based upon intrusion detection and mitigation. In response to a detected attack or as security against a potential future attack, systems and methods according to the present invention may generate, store and/or present deceptive materials that both serve as a means of gathering information about an attacker, and actively defend a system by misleading an attached with bogus material. Host-based security architecture may detect an intrusion and present to an attacker (whether human or malware) a deceptive computing environment that looks realistic and authentic, but presents deceptive data, thereby preventing the loss of real data.

Various means of detecting attacks may be employed including use of deceptive materials that act as "traps" to detect unauthorized access to data and programs. A goal of the present invention is to anticipate and respond to detected attacks using deception to protect systems and prevent attackers from ex-filtrating sensitive information by, for example, incorporating believable but fabricated information.

As part of a host-based system architecture, a software module may allow a virtualized file system on a host to deploy decoy applications and/or decoy files. Whether the decoy files are deployed may depend on the context of the authentication and importance of the virtual file view. The lower the authentication or security level of a user, the more decoy files may be presented to that user. The content of the decoy files may be configurable and/or the decoy files may be beaconized. The system may report usage and decoy file views. The names of the decoy files generated are similar in appearance to authentic files on the host system.

The present invention does not depend on the secrecy of design, but rather heavily depends upon realism and desirability of content that is dynamically and automatically created, and that is hard to judge as being real or fake. Numerous variations may be practiced in the preferred embodiment.

BRIEF DESCRIPTION OF THE DRAWINGS

A further understanding of the invention can be obtained by reference to embodiments set forth in the illustrations of the accompanying drawings. Although the illustrated embodiments are merely exemplary of systems, methods, and apparatuses for carrying out the invention, both the organization and method of operation of the invention, in general, together with further objectives and advantages thereof, may be more easily understood by reference to the drawings and the following description.

The drawings are not necessarily depicted to scale; in some instances, various aspects of the subject matter disclosed herein may be shown exaggerated or enlarged in the drawings to facilitate an understanding of different features. Also, the drawings are not intended to limit the scope of this invention, which is set forth with particularity in the claims as appended hereto or as subsequently amended, but merely to clarify and exemplify the invention.

FIG. 2 depicts a sample decoy document with false user information.

DETAILED DESCRIPTION OF THE INVENTION

The invention may be understood more readily by reference to the following detailed descriptions of embodiments of the invention. However, techniques, systems, and operating structures in accordance with the invention may be embodied in a wide variety of forms and modes, some of which may be quite different from those in the disclosed embodiments. Also, the features and elements disclosed herein may be combined to form various combinations without exclusivity, unless expressly stated otherwise. Consequently, the specific structural and functional details disclosed herein are merely representative. Yet, in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

The present invention is directed to systems and methods for injecting and detecting the use of decoy files and decoy applications. The present invention may be used on, for example, devices running the Android Operation System (OS). The system capabilities and features are generally described herein as applied to mobile devices, but the same technology may be implemented on any computer systems, such as laptops, desktops and servers.

A system according to the present invention may operate in any endpoint host and may include: (1) a security program that automatically injects a "deceptive" environment into the host OS including, among other pre-positioned computational objects, decoy files (e.g., in a local file system or cloud based storage system), presents one or more decoy user environments, and/or dynamically replaces a "real" user environment with one or more "decoy" user environments; (2) a network server that generates and updates deceptive materials, including standard documents and data of arbitrary type; and/or (3) a hypervisor architecture on which one or more virtual machines host a guest OS. The guest OS may be an ordinary system running endpoint application programs. The hypervisor may manage at least one virtual machine and the deceptive environment, and communication with network servers in the deployed security architecture.

Figure 1:
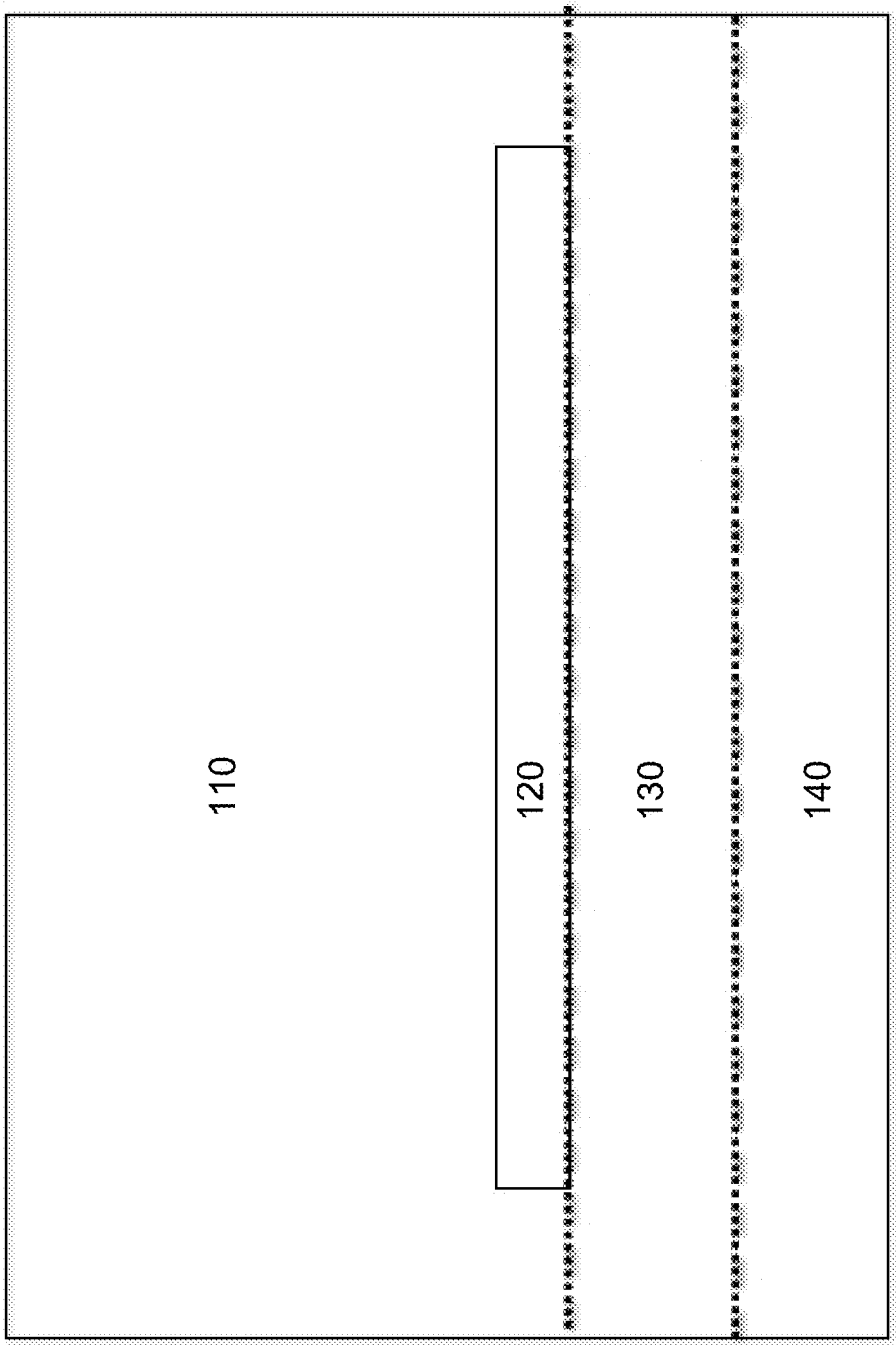
FIG. 1 depicts an architectural view of an exemplary host-based deception system.

FIG. 1 depicts an architectural view of an exemplary host-based deception system (100). The system may include application layer (110) by which a user may access and control software applications installed on the system. On a mobile device, application layer (110) may control display of icons (e.g., on a touch-sensitive display screen) representing software applications, and receive selections and/or commands from a user requesting, for example, that an application launch, provide data, or close. Host-based deception system (100) also includes operating system layer (130). Security controls (120) in accordance with the present invention may interface between application layer (110) and operating system layer (130). Security controls (120) provide endpoint detection and response.

A software module according to the present invention may generate and place decoy files within a file system. A virtualized file system (140) may also be used to store the decoy files. The decoy files may contain decoy credentials (for example, "sacrificial" email accounts) that may be monitored for misuse. In addition or in the alternative, the software module may embed within one or more files beacons that signal an alert when the files are opened. Beacons may be embedded in documents using methods of deception and obfuscation gleaned from studying malcode embedded inside documents as seen in the wild; the tables are thereby turned on attackers by using some of their own evasion methods to hide the beacons. The content of the decoy files may compel adversaries to act on their own to exploit a perceived advantage, thereby betraying their presence, purpose, and (to some extent) identity.

Whether the decoy files and decoy applications are visible to a user may depend on the user's authentication or security level. When a user is fully authenticated, the decoy files and decoy applications may not be visible to the user. As the authentication level of the user decreases, the amount of decoy files and decoy applications may progressively become more visible to the user.

The decoy files and decoy applications do not require special code or tagging for the system to detect that they have been accessed. When a user launches a decoy application or opens a decoy file, that action may be reported, for example, to a remote server. It is also possible to launch certain actions if the user authentication level drops below certain thresholds.

Mobile Host Module

The present invention uses an injection framework to hook specific Application Programming Interface (API) method calls to implement the functionality necessary to inject, track, and report the use of decoy files and decoy applications. The application instructs the injection framework which API method calls to hook. This application also implements a bound service that provides a client-server model of communication with the other applications on the device. The targeted API calls can be hooked before and after one of the targeted API calls executes, which allows modification of the input and output of the hooked API call. A custom implementation for the hooked API method call may be provided instead of allowing the actual implementation of the API method call to execute.

The application may persistently run in the background, for example, having a BroadcastReciever application component that receives a android.intent.action.BOOT_COMPLETED protected broadcast sent by an Android OS as the device completes the boot process. This BroadcastReceiver may start the Service application component. The service will be restarted if the OS kills it to free up resources on the device. The service is implemented as a bound service where all non-exempt applications will interact with it using the client interface.

Generally, on an Android device, the client application needs a corresponding Android Interface Definition Language (AIDL) file during compilation to appropriately perform Inter-Process Communication (IPC) with a bound service. The AIDL file is used to automatically generate the code needed to marshal (convert to byte streams) and unmarshal (convert back to original object) the parameters and return value when performing IPC with the bound service. With the present invention, the client applications may use dynamic class loading of a DEX file to obtain the classes necessary to interact with the bound service.

The same client interface may be presented to all client applications, but certain methods in the interface may be successfully called only by privileged applications on the device. The bound service may contain a list of package names that it considers to be privileged. Certain methods in the service that are exposed in the client interface may check the package name of the application that is calling the service prior to performing any meaningful functionality. If the application does not belong to the group of privileged applications, then it may simply return some value indicating that the operation was unsuccessful or that no additional action should be taken by the client application. Therefore, partner applications on the device may be allowed to perform privileged actions such as adding or removing decoy files at runtime, changing the current authentication level, deleting all decoy files on internal or external storage, and adding or removing decoy applications at runtime. Alternatively, all of these actions may be performed within the service itself.

An application may be installed as a normal user application, although a specific Android API call may be hooked to give the application the ability to have all permissions on the device. Therefore, the application may have the permissions of a system application and an application that has been signed with the platform key of the device. For example, the invention may make use of the android.permission.INSTALL_PACKAGES permission and the android.permission.DELETE_PACKAGES permission which both have a protection level of signatureOrSystem.

Below is an XML entry for the android.permission.INSTALL_PACKAGES permission from the frameworks/base/core/res/AndroidManifest.xml file in the Android 4.4 source code:

<!------ Allows an application to install packages. ------
><permission
android:
name="android.permission.INSTALL_PACKAGES"
android:label="@string/permlab_installPackages"
android:description="@string/permdesc_installPackages"
android:protectionLevel="signatureOrSystem" />

This permission may only be granted to applications that have been signed with a platform key or are installed as a system application. Since any permission on the device may be obtained, the application may be enabled to perform extra functionality that is not granted to normal user applications.

Two different exclusion lists may be employed by the application. The first exclusion list may contain package names of applications that should not have their methods hooked or simply immediately return once they are hooked. Some of the applications in this list may be Android OS applications. The application practicing the present invention and any partner applications may also be on this list. The exclusion list may reduce overhead on the device and ensure that certain applications will not have decoy files injected into their private directories on internal storage or directories opened on external storage. Some of the package names in this list may be applications that will not ever open a decoy file (e.g. the com.google.android.deskclock application).

A second exclusion list may include applications that are not to have their private directories injected with decoy files, but files opened by the applications could still be checked to determine if they are decoy files. This approach is necessary since certain applications may pass a file reference as a Uniform Resource Identifier (URI) in an Intent object to another application (e.g., com.android.chrome), so it can be accessed within the application.

Decoy Files

The injection of decoy files may occur as an application lists the files in a directory. The decoy files may be copied into the directory that the application is accessing. The specific set of decoy files that are injected into the directory that the application is accessing may be determined according to the package name of the application. Therefore, a specific set of decoy files can be tailored to and injected into the directories of a specific application. If no specific set of decoy files corresponds to an application, then a general set of decoy files may be injected into the directory. When the application makes a call to the bound service, the bound service can obtain the process ID, user ID, and package name of the application that has bound to the service.

The decoy files can be injected into the application's private directories, for example, on a device's internal storage and/or publicly accessible directories on external storage. All users may have read and write access to the external storage. During installation, each application may be given a user id. This user id may be used as the owner and group owner of the application's files and directories on internal storage. Therefore, user applications may not be able to access another application's files on the application's private internal storage by default. It is possible that an application can explicitly change the file permissions for its files and directories. The injection framework may be used to hook the application to create the files on its private internal storage since the service may not be able to access its files and directories directly.

Various constructors and methods may be hooked from the API that are used to perform file I/O. Whenever a non-exempt application opens a file for reading or writing, the client application may check with the bound service to see if the opened file is a decoy file. When a decoy file is opened, the event may be reported to a remote server. If the user's authentication level drops to a predetermined lower level, additional actions may be taken on the device. For example, sensitive files can be encrypted, the device can be made unresponsive, and/or legitimate applications can be uninstalled. The device may also be wiped programmatically if the application is declared to be a device administrator.

Decoy Applications

An application using the injection framework may detect when an application on the device is launched. If a user clicks on an icon for a decoy application using the launcher or otherwise attempts to launch a decoy application, a message may be sent to a remote server. The message may include information such as the name of the decoy application, the time that the decoy application was selected for launch, a user id, and/or a device id. An application does not need to be re-packaged to be designated as a decoy application. Any application can be downloaded from, for example, Google Play, or an application can be created and used as a decoy application.

An application according to the present invention may intercept some of the API method calls that occur when an application is launched. In addition or alternatively, an application may be detected once it starts interacting with the bound service. The constructors and methods of the Activity and Service application components may be hooked.

The bound service may obtain the package name of the application that is calling it, and check if the package name is associated with a decoy application. An API call may be hooked to ensure that the application has any permission on the device even if it is a system or signature permission. Therefore, a software application in accordance with the present invention (also referred to herein as the present application) may have the ability to install and uninstall user applications without any user interaction.

If a user is fully authenticated, no decoy applications may be shown on the home screen or the application list. As the user's authentication level decreases, an increasing proportion of the total decoy applications may become visible to the user. This process may be moderated by installing and uninstalling decoy applications as the user's authentication level fluctuates.

An access control module may be used to set user authentication levels that may authorize users to see some but not all applications and/or files, permit a user to see only decoy applications and/or files (i.e., hide real applications and/or files), or install or uninstall applications. The access control module may assign an initial authentication level to a user. The authentication level may be associated with a user's user id, or with a session that terminates after a period of time or when the user logs out. The authentication level may be determined at the time a user logs into the system, or the authentication level may be a predetermined level stored in the system for a user or a session. If a user attempts to log into the system but fails to input valid login credentials, the system may assign to the user a different (e.g. lower) authentication level. The different authentication level may be assigned after one failed login attempt or after a predetermined number of failed login attempts.

In some contexts the authentication level may be determined by an "authorization system" or method that tracks the extent to which the user's behavior is consistent with a behavior model previously profiled for the user. In other contexts the authentication level may be categorically assigned by an authorization system permitting or limiting authorized access based upon the role of the user or other properties associated with the user. For example, authentication level may be assigned according to a level of "classification" such as Secret or Top Secret. In other contexts, "authorization level" may simply be binary, "authorized" versus "not authorized." Regardless of the authentication context, the present invention may deceive the user whenever the user's authentication level changes to a level deemed a security threat or a risk. For example, the deception environment may be entered upon failed login attempts. Alternatively, the host deception environment may be initiated if a host application, such as an anti-virus program, deems the host to be under attack.

If a malicious activity by the user (or a process created by the user) is detected, then decoy applications and/or files may be presented to the user or process. If activity is detected as suspicious but not necessarily identified as malicious activity, the user may be asked for authentication information. If the user fails to authenticate properly, decoy applications and/or files may be presented to the user. In addition or in the alternative, if a user authenticates properly, formerly hidden applications and/or authentic files may be made accessible to the user.

The approach of installing and uninstalling applications as a user's authentication level fluctuates provides a launcher-agnostic solution. Alternatively, it may be done on a per-launcher basis, but that would require a specific solution for each launcher since a user can simply install and use another launcher instead of the standard launcher (e.g., Google launcher). Then a specific solution would be required for the launcher that was just installed and any other launcher that the user decides to install. If a solution for each specific launcher is required, the application may be disassembled to find which method calls within the launcher application to hook to ensure that the decoy applications either appear or do not appear, depending on the user's authentication level.

Alternatively, protected broadcasts may be used to make other applications believe that an application was either installed or uninstalled when it has not been modified in any way. All the decoy applications may be installed when the present application is first installed. Then a decoy application may be hidden by sending, for example, the android.intent.action.PACKAGE_REMOVED protected broadcast with data for the app. The launcher application may receive this broadcast and update its list of applications that is displays accordingly. To display a decoy application, the android.intent.action.PACKAGE_INSTALL protected broadcast may be sent with data for the application.

Hiding Applications

A software application in accordance with the present invention and any other non-decoy applications may be hidden from the user. This may be done at the API level by hooking certain API calls that are used to obtain a list of installed applications and running applications. These Android API method calls may be hooked and examined for the presence of the package names that should be hidden, the package names may be removed, and the modified data structure may be returned. Therefore, any applications may be hidden from the home screen and from the list of all applications in the launcher.

The Settings application is one method by which a user might access a list of the running, installed, and downloaded applications on the device (e.g., com.android.settings). The Settings application may also allow users to stop currently executing applications and/or uninstall them. If a software application in accordance with the present invention and any other applications that are hidden are not visible within the Settings application (e.g., not included on a list of running, installed, or downloaded applications), they could not be stopped using this method.

User applications can use an API to obtain the list of installed and currently running applications. These API calls are hooked to set which applications will not show up even if examined outside of the context of the Settings application. Certain applications may also be hidden from the Google launcher. This would allow a software application in accordance with the present invention and any partner applications to not appear on the home screen of a device or the list of all installed applications. A set of Android API calls may be used by the Google launcher when initially populating the list of installed applications on the device after it has completed the boot process. This initial list may stay static and not change unless the Google launcher application receives the various system broadcasts indicating that an application has been installed, updated, or uninstalled. So, the framework applications may be prevented from entering the data structure of applications in the Google launcher as it is initially populated.

Preventing Uninstallation of Applications

Android Applications are generally uninstalled via the Settings app, but they may also be removed via the Android Debugging Bridge (ADB). ADB has special permissions that a normal user application does not have such as the ability to install and uninstall applications, read the Android log to get log entries from all processes, and execute certain commands (e.g., dumpstate). Certain Android API calls to hook that ADB uses to uninstall applications may be addressed to ensure that a software application in accordance with the present invention is not uninstalled. This allows persistence on the device even if the user becomes aware of any of the package name of the present application. In addition, a software application in accordance with the present invention cannot be uninstalled via the Settings app.

Generally, a user cannot overwrite an existing application using ADB. A user generally receives the INSTALL_FAILED_ALREADY_EXISTS message when they attempt to do so. A user may be able to use the "r flag" when installing an application to overwrite an existing package via ADB. Therefore, the user could overwrite the existing packages with another one with the same package name to remove a software application in accordance with the present invention if they are aware of the package name. However, the installation of certain package names can be prevented to prevent this type of attack on the present application.

Remote Server Module

The following key features may be added to a server in order to implement the decoy file system:

Secure communications between device and the present system using OAuth2.0 methods Ability to request creation of decoy files as a batch process Ability to request specific kinds and themed documents Ability to request bundles of decoy files previously created Optimization of decoy creation process to fulfill the batch process Internal optimization of database support to allow dynamic decoy requests and service Ability of a mobile device to report decoy touches, authentication levels and other information back to the server instance The software may control the view of the file system and allow the system to deploy decoy documents depending on the context of the authentication and importance of the virtual file view. The lower the authentication, the more decoy documents may become visible.

The software may use secure https requests to communicate with the present system. An account on the present system may be associated with a specific user who owns a mobile device. This account may configure an OAuth 2.0 token/secret pair which may be used to secure and authenticate requests between a mobile device and a server. An API token request can be made once logged in which will display the token portion of the secure communications. Secondary channels may be used to request the "secret" portion of the API token. Both are needed to secure and authenticate the requests. The token portion is associated with a specific account on the present system. Tokens can also be marked as "Decoys" that can generate an alert when accessed. In addition, the "secret" string may be used to digest any requests so that the system can check if the https requests have been tampered with or "replayed" by an adversary.

API requests in accordance with the present invention may include the following:
- Token associated with a specific user account (for alerts and reports)
- Number of Decoys requested (e.g., default to 10)
- Type of Decoy vessels (e.g., pdf, docx, mixed, others)
- Theme of the decoys (e.g., specific themes or mix)
- Delivery (e.g., zip file, leave on server for later, request single file downloads)
- Tag Name for future downloads
- New/Old indication (i.e. if software is requested to generate a fresh batch of decoys or re-bundle previously created decoys)

A server may be used to process the request and then either zip and send out a decoy archive or store it on the server for later deployment. The system may cache the archives for mobile deployment to make the download process more efficient. When decoy documents are accessed on the mobile platform or authentication levels are triggered, an event may be encoded on the mobile platform and the system may report back to present system using an API post with some or all of the following:
- Token associated with the specific user account
- Title of report
- Body of the report
- Timestamp from device
- Miscellaneous information about the device or event In addition, an internal database management framework may support dynamic table creation and updates so that future features could be added with minimum effort and changes to the overall system. For example, if one wanted to add a database column to an existing table, the present system on startup may scan each table and column and automatically add missing columns. In addition, some of the tables may need to be populated with seed data. This may be automated during table updates rather than during the install process.

Overview of Automated Decoy Content Generation System

Figure 2:
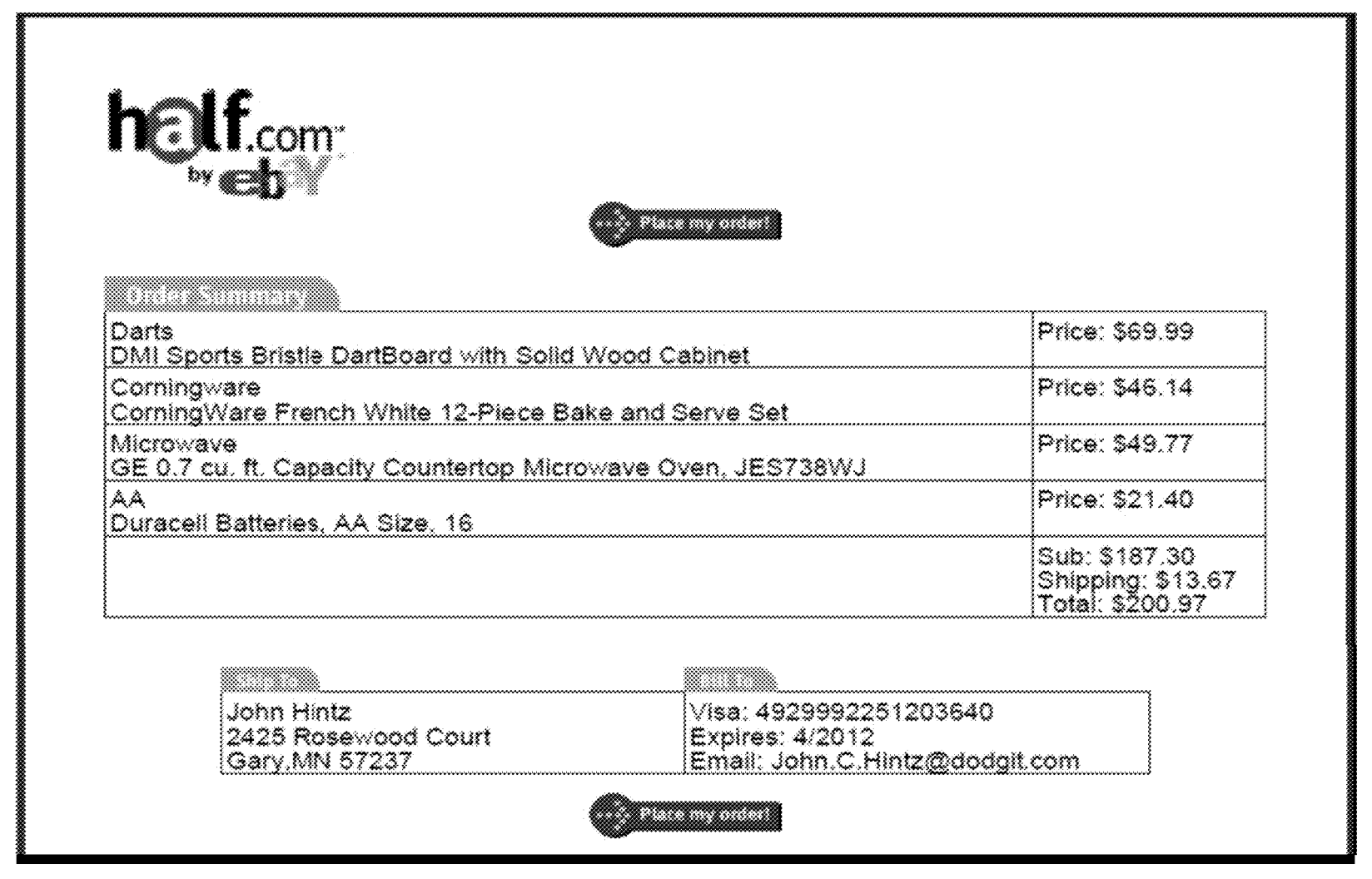

The system is intended to confuse and deceive a sophisticated attacker by leveraging uncertainty, to reduce the knowledge they ordinarily have of the systems and data they might be authorized to use. The system may be employed to distribute potentially large amounts of hyper-realistic decoy information within a file system and network cloud storage systems with the aim to detect nefarious acts as well as to increase the workload of an attacker to identify real information from bogus information, rather than providing unfettered access as broadly exists today. Samples of decoy documents are presented in FIGS. 2 and 3.

By way of summary, the system provides:
- A large-scale automated creation and management system for deploying decoys that can confound and confuse the sophisticated attacker.
- An offensive trap-based defense system to flood attackers with bogus exfiltrated information that they must analyze in order to find real information of value.
- An easy-to-use system to broadly deploy decoy data within a file system or cloud storage systems that is indistinguishable from the real data upon which it is based.

Creating Highly Realistic Decoy Data

The goal in creating such an infrastructure is to automatically and strategically modify real documents and data to (a) be indistinguishable from the real thing, and (b) avoid revealing real and sensitive information. One method the present system may use to accomplish this goal focuses on modifying "time" explicitly appearing in documents to ensure the decoys are realistic. In addition or in the alternative, other content may be modified according to specifications that best fit the operational requirements of the system being defended, as determined by defensive security personnel.

Since the approach wholly depends upon the believability of the bait information, Natural Language Generation may be applied to provide realistic and believable content.

Decoy Properties

Preferably, an adversary would have difficulty discerning whether a decoy document or application is authentic and/or from a legitimate source. A "perfect decoy" is defined herein as a decoy that may be chosen in a believability experiment with a probability of ½ (i.e., the outcome that would be achieved if a volunteer decided completely at random). That is, a perfect decoy is one that is completely indistinguishable from one that is not. Under this definition, the challenge of showing a decoy to be believable reduces to the problem of creating a "distinguisher" that can decide with probability better than ½. The notion of a "perfect decoy" provides a goal to strive for in design and implementation of systems. As shown, for example in FIG. 2, common forms-based documents may be generated with decoy credentials, realistic names, addresses and logins, all information that is familiar users.

In addition to content generation, the present system may also insert misinformation that an adversary may act upon, thereby betraying his or her presence. Such misinformation includes URLs (e.g., for various protocol types, such as FTP, HTTP/HTTPS, and SFTP) and username/password credentials. Both types of misinformation may be directed to dedicated honeypots operated by an enterprise (possibly outside the enterprise perimeter, e.g., by leveraging a Cloud service provider such as Amazon EC2 or Google AppEngine), production servers whose logs and/or network interactions are monitored, or public services that can be monitored externally (e.g., Gmail accounts). The specifics of each instance of such misinformation are recorded such that future accesses/uses of it can be traced back to the specific document through which they leaked. Depending on the frequency of generation and deployment of decoy documents, both a location (e.g., the host, server, directory) and timeframe of the leakage can be established, even if the actual act of accessing was not otherwise detected by the system.

Generating Believable Email Traffic Flows

Figure 3:
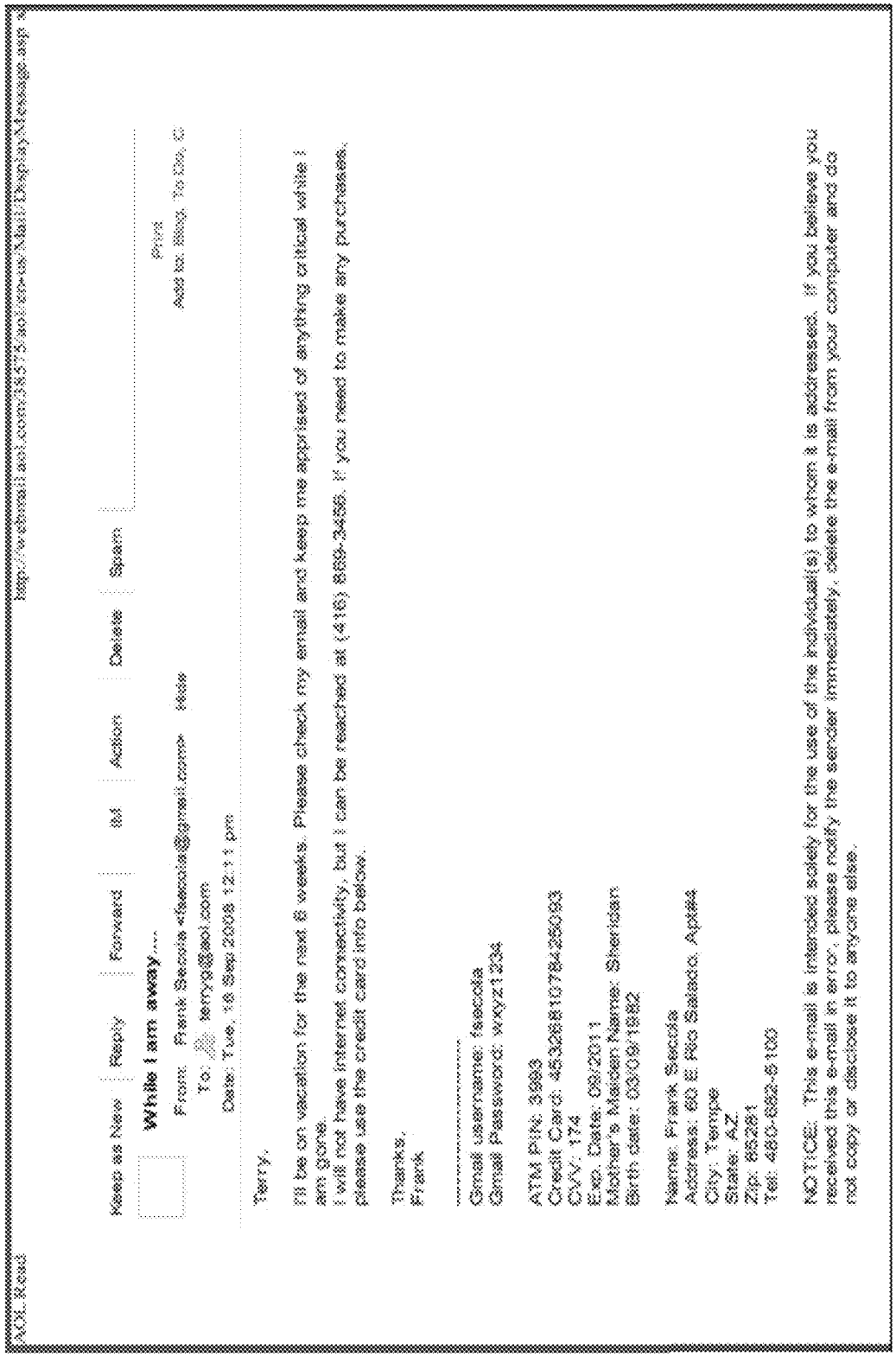
FIG. 3 depicts a sample decoy email message with embedded decoy credentials.

Given the objective of creating a pervasive system of "high realism," believability is a crucial property. Algorithms and systems may be developed for automated translation of regular documents and information flows and data from an arbitrary enterprise network into a translated information flow that mimics realistic human behavior. Such information may include, among other data, decoy username/password credentials, decoy emails with attached decoy documents, URLs, and realistic timing information representing the rate at which such information flows on a network. FIG. 3 depicts an example of a decoy email that was automatically generated.

Content generation technology may provide realistic and believable content flows between clients and servers. The content of certain emails (possibly with attached documents) may be more difficult to generate than others. For realistic email and document content generation, static content (from public sources such as blogs) may be transformed, and believable new content may be generated by applying Natural Language Generation technologies.

Natural Language Generation of Decoy Data

A significant body of realistic data may be acquired, suitably modified and replayed as bait information. However, replaying prior human-generated content may not be believable and, if the bait information is obviously replayed data, may tip off an attacker that they have been trapped by a decoy message or document. The complexity of the natural language processing tasks is exemplified by the treatment of time and temporal information when creating bait, as well as geographical constraints, places/people references, and other application-specific constraints. Temporal aspects include references to absolute dates in myriad formats, relative dates, events fixed in time to specific dates, and shifts that don't manifest themselves in the content but rather manifest themselves in the statistical representations of the distributions of interaction frequencies and correlations through traffic analysis. For example, a message body or document that references a meeting to take place tomorrow, with an embedded date that is 5 years earlier than the present date will be a certain giveaway.

Similar concerns arise from references to places (locations) and people. The same natural language processing techniques may be applied to extract the semantic relationships among the relevant textual entities, and to transform them so that they refer to different entities while remaining consistent.

These capabilities may be integrated with organization- and application-specific constraints to generate decoy documents having bait information (bait documents) that are representative of typical workflows. A bait document generation engine may be implemented to operate around the concept of flexible templates: these are documents that are often used in an organization (e.g., spreadsheets) and encode invariants/features that are common for a given environment, while allowing for automated customization. The present system may provide a service interface that allows system administrators to easily import and integrate new templates into the system, by defining (through a combination of GUI and simple language) what type of information to embed and where in the template to embed it. This system may implement a number of templates, representing a broad spectrum of "interesting" documents that malicious adversaries may be looking for. While any given organization will likely use and need different documents, the present system has the ability to quickly import these into a bait generation system.

Figure 4:
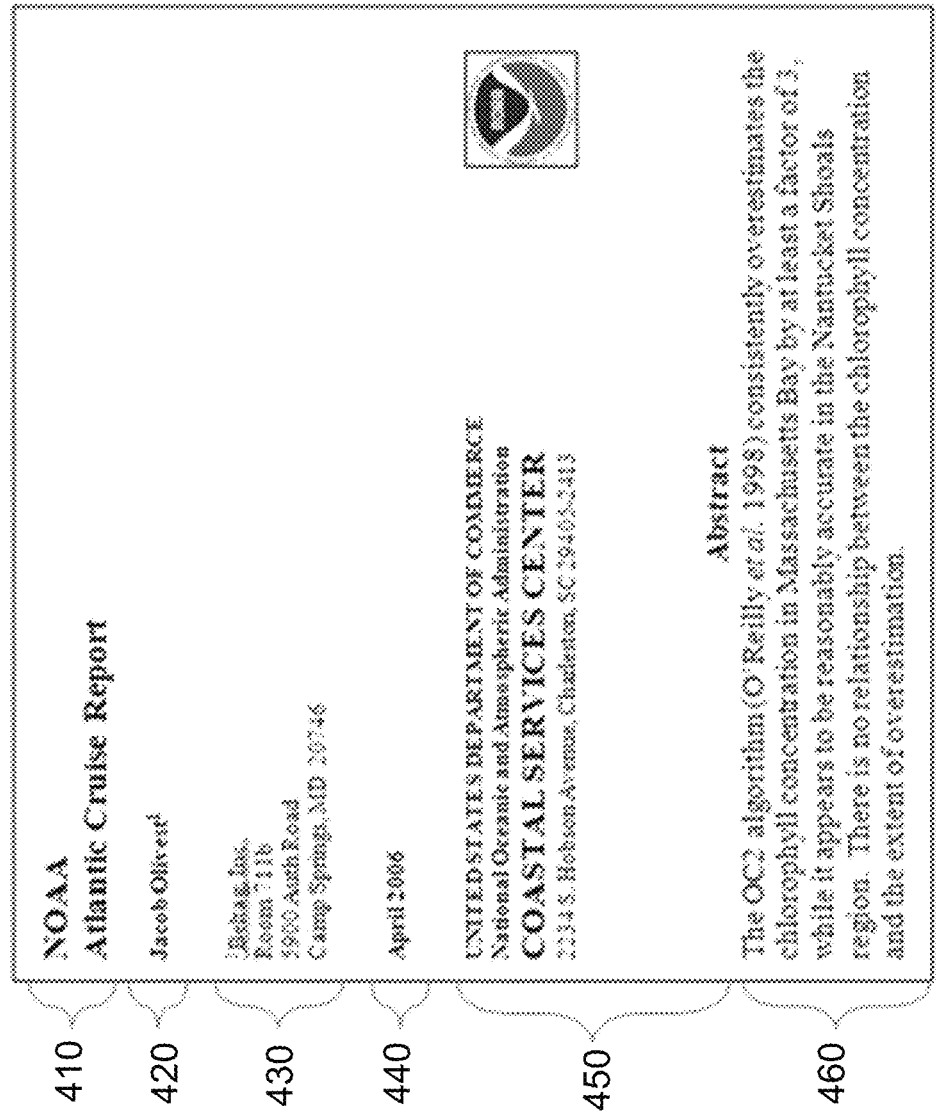
FIG. 4 depicts a sample template document with areas marked invariant or mutable, along with the data type for fields.
Figure 5:
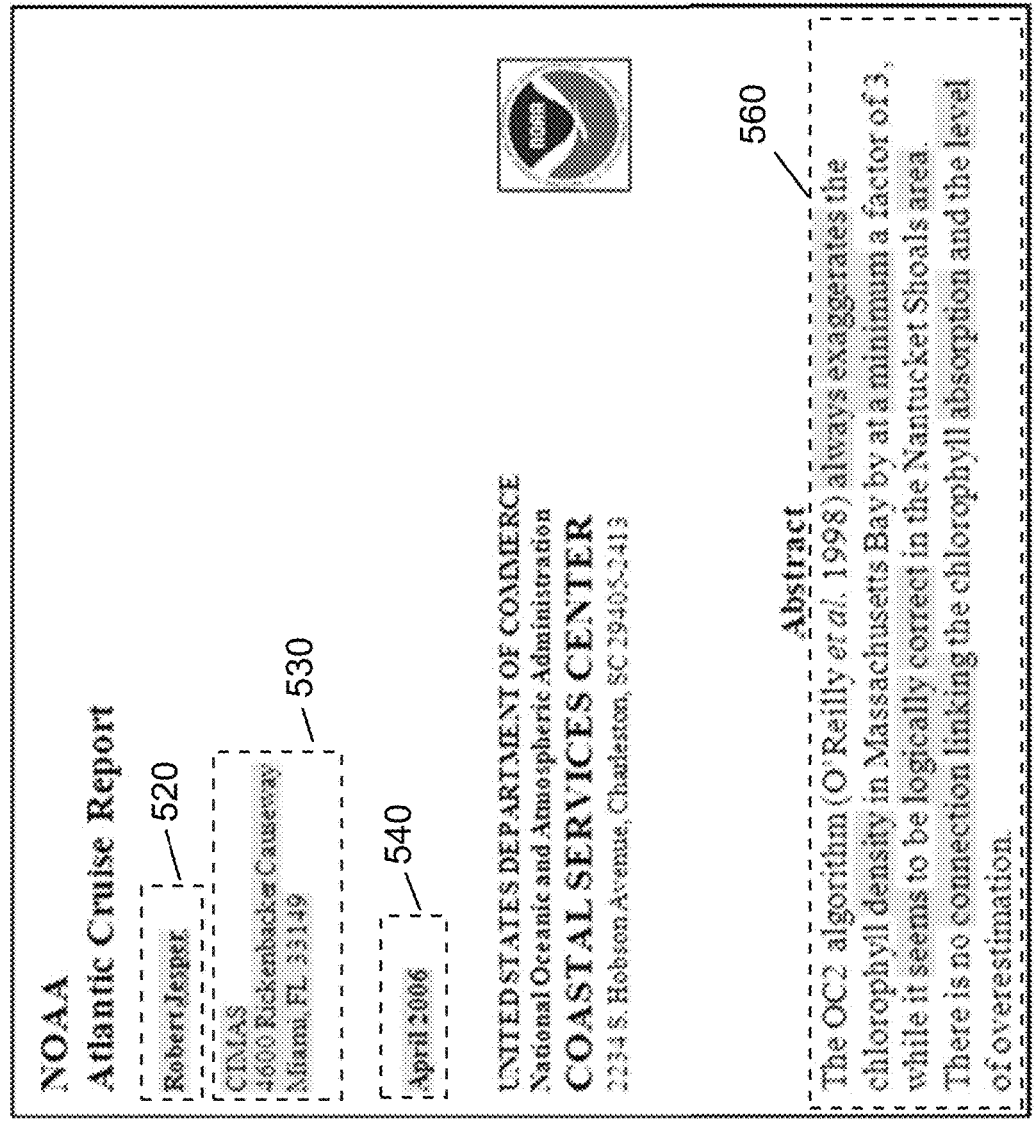
FIG. 5 depicts a bait document corresponding to the template document depicted in FIG. 4.

FIGS. 4 and 5 show a template and a generated bait document, respectively. Referring to FIG. 4, the template may include one or more sections identified as invariant (410, 450), one or more sections identified as a person's name (420), one or more sections identified as generic (430, 440), and one or more sections identified as "semantically equivalent" (460). As shown in FIG. 5, bait information may be used to change a person's name (e.g., the addressee of a document) to a different name (520), and/or change generic information such as a mailing address and/or the date of a document (530, 540). In addition or in the alternative, natural language processing techniques can be used to modify the body of the document (560). The inserted bait information may be used as indicators to signal when decoy files are requested or accessed.

While the invention has been described in detail with reference to embodiments for the purposes of making a complete disclosure of the invention, such embodiments are merely exemplary and are not intended to be limiting or represent an exhaustive enumeration of all aspects of the invention. It will be apparent to those of ordinary skill in the art that numerous changes may be made in such details, and the invention is capable of being embodied in other forms, without departing from the spirit, essential characteristics, and principles of the invention. Also, the benefits, advantages, solutions to problems, and any elements that may allow or facilitate any benefit, advantage, or solution are not to be construed as critical, required, or essential to the invention. The scope of the invention is to be limited only by the appended claims.

What is claimed is:

1. A method of operating a host-based security system comprising:
   generating a set of decoy files from a first set of documents by, in each document of the set, replacing a first information with second information;
   determining a first authentication level for a user;
   displaying a first quantity of decoy files corresponding to the authentication level;
   determining a second authentication level for the user; and
   upon determining the second authentication level, displaying a second quantity of decoy files.

2. The method of claim 1, wherein the first quantity of decoy files is zero and the second quantity of decoy files is greater than zero.

3. The method of claim 1, wherein the first quantity of decoy files is greater than zero.

4. The method of claim 3, wherein the second quantity of decoy files is greater than the first quantity of decoy files.

5. The method of claim 3, wherein the second quantity of decoy files is less than the first quantity of decoy files.

6. The method of claim 3, wherein the set of decoy files includes a decoy file having an embedded beacon.

7. The method of claim 1, wherein the second authentication level is determined based on a failed login attempt by the user.

8. The method of claim 1, wherein the second authentication level is determined based on a signal received from a host application.

9. A method of operating a host-based security system comprising:
   generating a set of decoy files from a first set of documents, in each document of the set, embedding a beacon;
   determining a first authentication level for a user;
   displaying a first quantity of decoy files corresponding to the authentication level;
   determining a second authentication level for the user; and
   upon determining the second authentication level, displaying a second quantity of decoy files.

10. The method of claim 9, wherein the first quantity of decoy files is zero and the second quantity of decoy files is greater than zero.

11. The method of claim 9, wherein the first quantity of decoy files is greater than zero.

12. The method of claim 11, wherein the second quantity of decoy files is greater than the first quantity of decoy files.

13. The method of claim 11, wherein the second quantity of decoy files is less than the first quantity of decoy files.

14. The method of claim 9, wherein the second authentication level is determined based on a failed login attempt by the user.

15. The method of claim 9, wherein the second authentication level is determined based on a signal received from a host application.

16. A method of operating a host-based security system comprising:
- generating a set of decoy files;
- determining a first authentication level for a user;
- displaying a first quantity of decoy files corresponding to the authentication level;
- determining a second authentication level for the user; and
- upon determining the second authentication level, displaying a second quantity of decoy files;
- wherein the second quantity of decoy files is less than the first quantity of decoy files.

17. The method of claim 16, wherein the set of decoy files includes a decoy file having an embedded beacon.

18. The method of claim 16, wherein the second authentication level is determined based on a failed login attempt by the user.

19. The method of claim 16, wherein the second authentication level is determined based on a signal received from a host application.

* * * * *